US012173541B2

(12) United States Patent
Chung et al.

(10) Patent No.: US 12,173,541 B2
(45) Date of Patent: Dec. 24, 2024

(54) PIVOTING DEVICE

(71) Applicant: Sinher Technology Inc., New Taipei (TW)

(72) Inventors: Feng Yu Chung, New Taipei (TW); Chih Huang Peng, New Taipei (TW); Nan Hai Lai, New Taipei (TW)

(73) Assignee: SINHER TECHNOLOGY INC., New Taipei (TW)

( * ) Notice: Subject to any disclaimer, the term of this patent is extended or adjusted under 35 U.S.C. 154(b) by 90 days.

(21) Appl. No.: 18/310,942

(22) Filed: May 2, 2023

(65) Prior Publication Data

US 2023/0366248 A1 Nov. 16, 2023

(30) Foreign Application Priority Data

May 12, 2022 (TW) .................................. 111204901

(51) Int. Cl.
*G06F 1/16* (2006.01)
*E05D 3/12* (2006.01)

(52) U.S. Cl.
CPC .................................... *E05D 3/122* (2013.01)

(58) Field of Classification Search
CPC .................................................... E05D 3/122
See application file for complete search history.

(56) References Cited

U.S. PATENT DOCUMENTS

| | | | | |
|---|---|---|---|---|
| 9,848,502 B1* | 12/2017 | Chu | ....................... | G06F 1/1681 |
| 10,401,917 B1* | 9/2019 | Dai | ....................... | G06F 1/1679 |
| 10,664,021 B1* | 5/2020 | Hsu | ....................... | H04B 1/3888 |
| 10,824,197 B1* | 11/2020 | Hsu | ....................... | G06F 1/1641 |
| 10,983,569 B2* | 4/2021 | Lin | ....................... | G06F 1/1616 |
| 11,016,541 B2* | 5/2021 | Lin | ....................... | F16C 11/04 |
| 11,334,122 B2* | 5/2022 | Hsu | ....................... | E05D 11/082 |
| 11,408,214 B1* | 8/2022 | Hsu | ....................... | H04M 1/022 |
| 11,516,932 B2* | 11/2022 | Sim | ....................... | E05D 3/122 |
| 11,579,661 B2* | 2/2023 | Kinoshita | ............. | G06F 1/1681 |
| 11,644,873 B2* | 5/2023 | Hsu | ....................... | G06F 1/1681 |
| | | | | 361/679.27 |
| 2017/0208703 A1* | 7/2017 | Lin | ......................... | E05D 5/02 |

(Continued)

FOREIGN PATENT DOCUMENTS

| | | |
|---|---|---|
| CN | 114046313 A | 2/2022 |
| TW | M575953 | 3/2019 |

(Continued)

*Primary Examiner* — Jason W San
(74) *Attorney, Agent, or Firm* — MUNCY, GEISSLER, OLDS & LOWE, P.C.

(57) ABSTRACT

A pivoting device, including a hinge assembly and at least two support plates. The hinge assembly includes a base, two movable members on the base, at least two fixed members connecting the movable members, and two driven levers on the base and driven by the fixed members; the base has at least two rails where the movable members are provided, the movable members enable a flexible display to be folded when moving in an arc-shaped path, and the fixed members each have an oblique slot allowing one driven lever to move therein. The support plates each have a sliding rail portion at an end thereof and allowing one driven lever to slide therein, and when the driven levers are slide along the sliding rail portion and the oblique slot simultaneously, the support plates are flipped up and tilt outwards.

11 Claims, 5 Drawing Sheets

(56) References Cited

U.S. PATENT DOCUMENTS

| | | | | |
|---|---|---|---|---|
| 2017/0269637 | A1* | 9/2017 | Lin | E05D 7/00 |
| 2019/0208656 | A1* | 7/2019 | Myeong | H10K 50/84 |
| 2020/0375046 | A1* | 11/2020 | Sim | H05K 5/0017 |
| 2020/0409429 | A1* | 12/2020 | Hsu | E05D 11/06 |
| 2021/0173449 | A1* | 6/2021 | Yao | G06F 1/1616 |
| 2022/0412138 | A1* | 12/2022 | Peng | E05D 3/122 |
| 2023/0152849 | A1* | 5/2023 | Park | G06F 1/1681 |
| | | | | 361/679.01 |
| 2023/0205280 | A1* | 6/2023 | Kim | G06F 1/1616 |
| | | | | 361/679.27 |
| 2023/0217616 | A1* | 7/2023 | Park | G06F 1/1679 |
| | | | | 361/807 |
| 2023/0244274 | A1* | 8/2023 | Lin | G06F 1/1616 |
| | | | | 361/679.27 |
| 2023/0366248 | A1* | 11/2023 | Chung | G06F 1/1681 |
| 2024/0133225 | A1* | 4/2024 | Mortland | E05F 15/614 |
| 2024/0160252 | A1* | 5/2024 | Hsu | G06F 1/1681 |
| 2024/0175463 | A1* | 5/2024 | Hsu | F16C 11/04 |
| 2024/0251515 | A1* | 7/2024 | Zhan | H04M 1/022 |

FOREIGN PATENT DOCUMENTS

| | | |
|---|---|---|
| TW | M586375 | 11/2019 |
| TW | I682261 | 1/2020 |
| TW | I695666 | 6/2020 |
| TW | M601843 | 9/2020 |
| TW | M614799 | 7/2021 |
| TW | 202132878 | 9/2021 |
| TW | 202132941 | 9/2021 |

\* cited by examiner

PIVOTING DEVICE

FIELD OF THE INVENTION

The invention relates to a pivoting device and particularly to a pivoting device provided for a flexible display.

BACKGROUND OF THE INVENTION

According to the patent search results, there are many technical solutions related to flexible displays in the technical field of hinges, such as those disclosed in Chinese Patent Publication No. CN 114046313A, Taiwan Utility Model Patent and Taiwan Patent Nos. TW M575953, TW M614799, TW 1695666, TW M586375, TW M601843, TW 202132878, TW 202132941, and TW 1682261.

However, a conventional hinge has a complicated structure to satisfy a folded length of a flexible display when an electronic device is folded. The cumbersome components in a pivoting device render the assembling job difficult and make it harder to implement a lighter and thinner design. The applicant of the invention, to solve the above-mentioned problems, invented a hinge structure different from the conventional hinge.

SUMMARY OF THE INVENTION

It is an object of the invention to solve the problem that it is difficult for flexible displays with a conventional hinge to be lighter and thinner.

To achieve the above object, the invention provides a pivoting device including a hinge assembly and at least two support plates. The hinge assembly includes a base, two movable members provided on the base, at least two fixed members connecting the two movable members and provided for a flexible display to be fixed thereon, and two driven levers provided on the base and driven by the two fixed members. The base is formed with at least two rails respectively restricting the two movable members to displace in an arc-shaped path, the two movable members drive the two fixed members and fold the flexible display during the displacement in the arc-shaped path, and each of the two fixed members includes an oblique slot provided for one of the two driven levers to move therein. The at least two support plates are disposed side by side to the hinge assembly and moving synchronously with the flexible display. The at least two support plates are respectively formed with a sliding rail portion at an end of each of the at least two support plates, the sliding rail portion is provided for one of the two driven levers to slide therein, and when the two driven levers do not slide along the sliding rail portion, the at least two support plates are laid flat so as to provide support for the flexible display; when the two driven levers are driven to slide along the sliding rail portion and the oblique slot simultaneously, the at least two support plates are flipped relative to each other and tilt outwards.

In an embodiment, each of the two driven levers includes a first engaging section forming a junction with the base, a second engaging section forming a junction with one of the two fixed members, and a bent section connecting the first engaging section and the second engaging section.

In an embodiment, each of the two driven levers is formed with a first engaging arm and a second engaging arm at an end not engaged with the base, the first engaging arm is inserted into the oblique slot, and the second engaging arm is on a side opposite to the first engaging arm and inserted into the sliding rail portion.

In an embodiment, the at least two support plates include a first portion overlapping one of the two movable members and one of the two driven levers, and a second portion perpendicular to the first portion and assembled on a side of the two driven levers opposite to the two fixed members.

In an embodiment, the hinge assembly includes a torque-providing portion connected to the base and providing a torque force for the two movable members to rotate.

In an embodiment, the torque-providing portion includes a support, two rotating shafts provided in parallel on the support, and an idler gear provided between the two rotating shafts, and wherein each of the two rotating shafts includes a connecting member and a gear, the connecting member is engaged with one of the two movable members to move the torque-providing portion and the two movable members synchronously, the gear is engaged with the idler gear, and the gears of the two rotating shafts and the idler gear are cross-axis helical gears.

In an embodiment, the idler gear includes a positioning hole, and the support includes a first plate and a second plate perpendicular to the first plate and provided for the idler gear to be placed thereon, the second plate includes an idler gear retaining hole in communication with the positioning hole, an engaging member is disposed in the idler gear retaining hole when the idler gear is disposed on the second plate.

In an embodiment, the torque-providing portion includes a plurality of torque springs provided at an end of each of the two rotating shafts, respectively.

In an embodiment, each of the two rails is provided with an arc-shaped rib on two inner walls thereof, and each of the two movable members is provided with an arc-shaped groove on two side walls thereof accommodating the arc-shaped rib.

In an embodiment, the two rails includes two open ends, and the two open ends of the two rails are positioned on two opposite faces of the base.

In an embodiment, one of the two movable members includes a positioning notch facing an another of the two movable members, and the another of the two movable members includes a positioning projection inserted into the positioning notch.

In view of the foregoing, the invention has the following advantageous effects compared to the conventional technique. Through the arrangement of the hinge assembly and the two support plates, the two support plates support the flexible display when not being driven, and the two support plates tilt outwards when being flipped, the pivoting device complies with the length of the flexible display therewith. In addition, the invention has a simpler structure than the conventional technique and is conducive to implementing a lighter and thinner design.

DETAILED DESCRIPTION OF THE PREFERRED EMBODIMENTS

The detailed description and technical aspects of the invention are described below in conjunction with the accompanying drawings.

Figure 1:
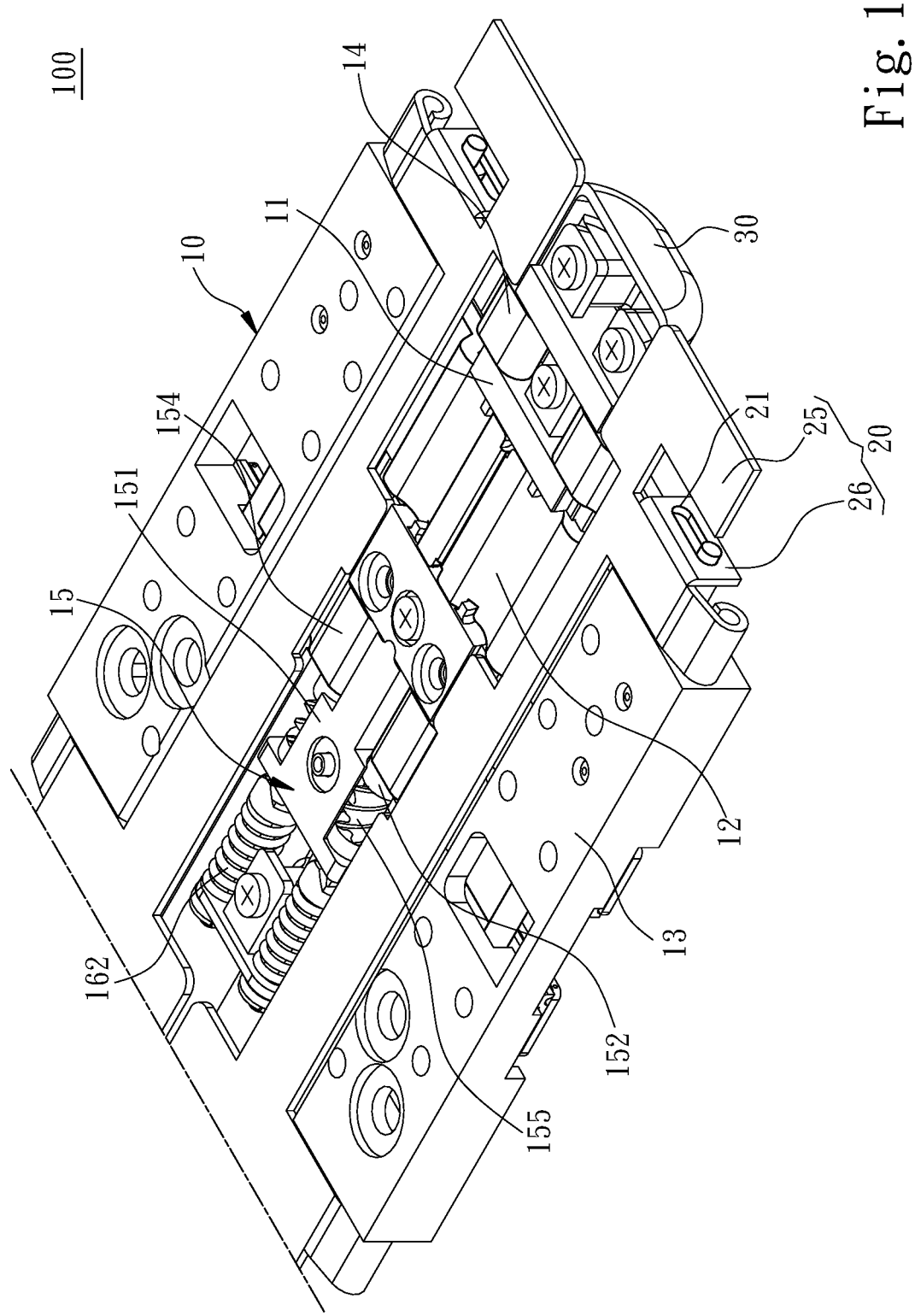
FIG. 1 is a schematic view of an embodiment of the invention.
Figure 2:
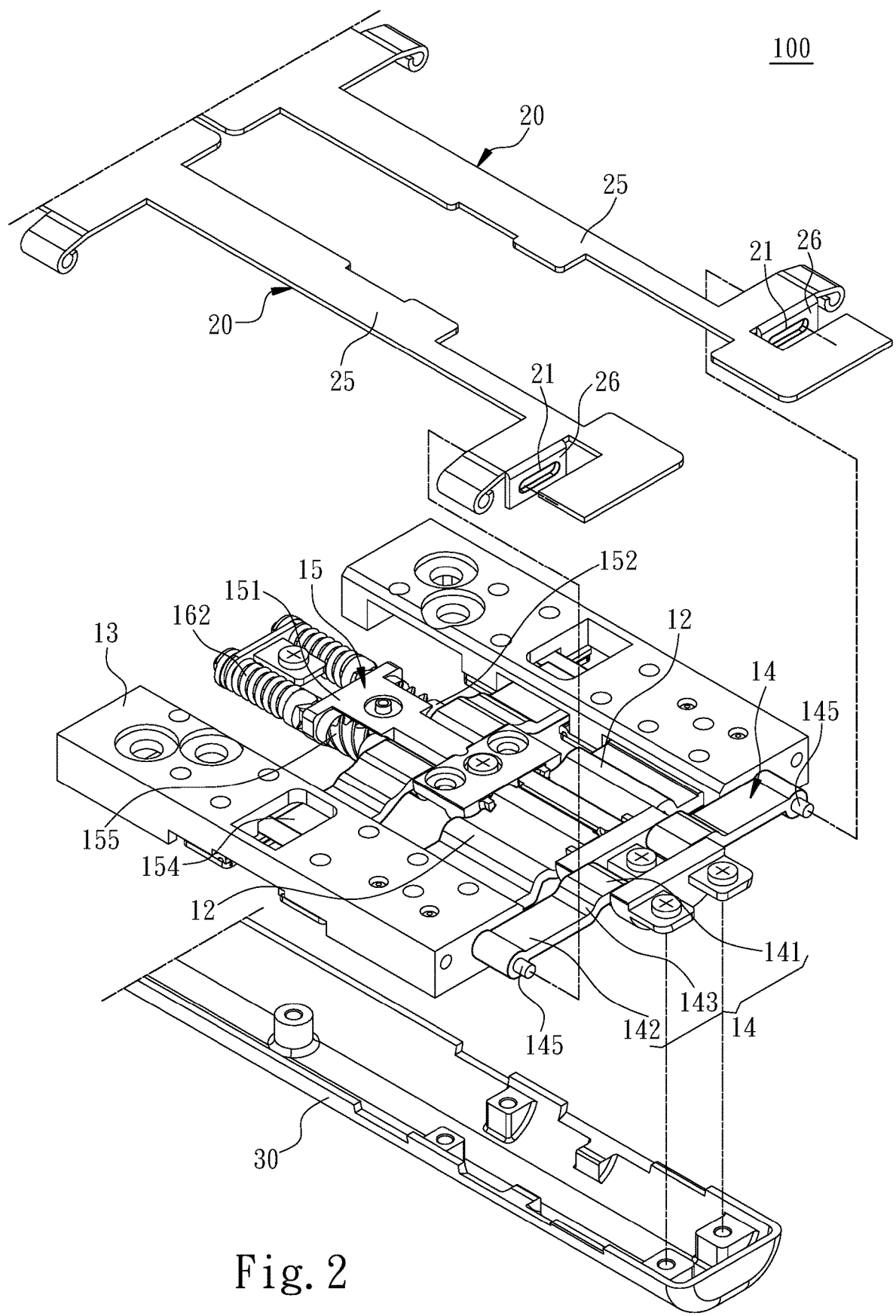
FIG. 2 is a first exploded view of the embodiment of the invention.
Figure 3:
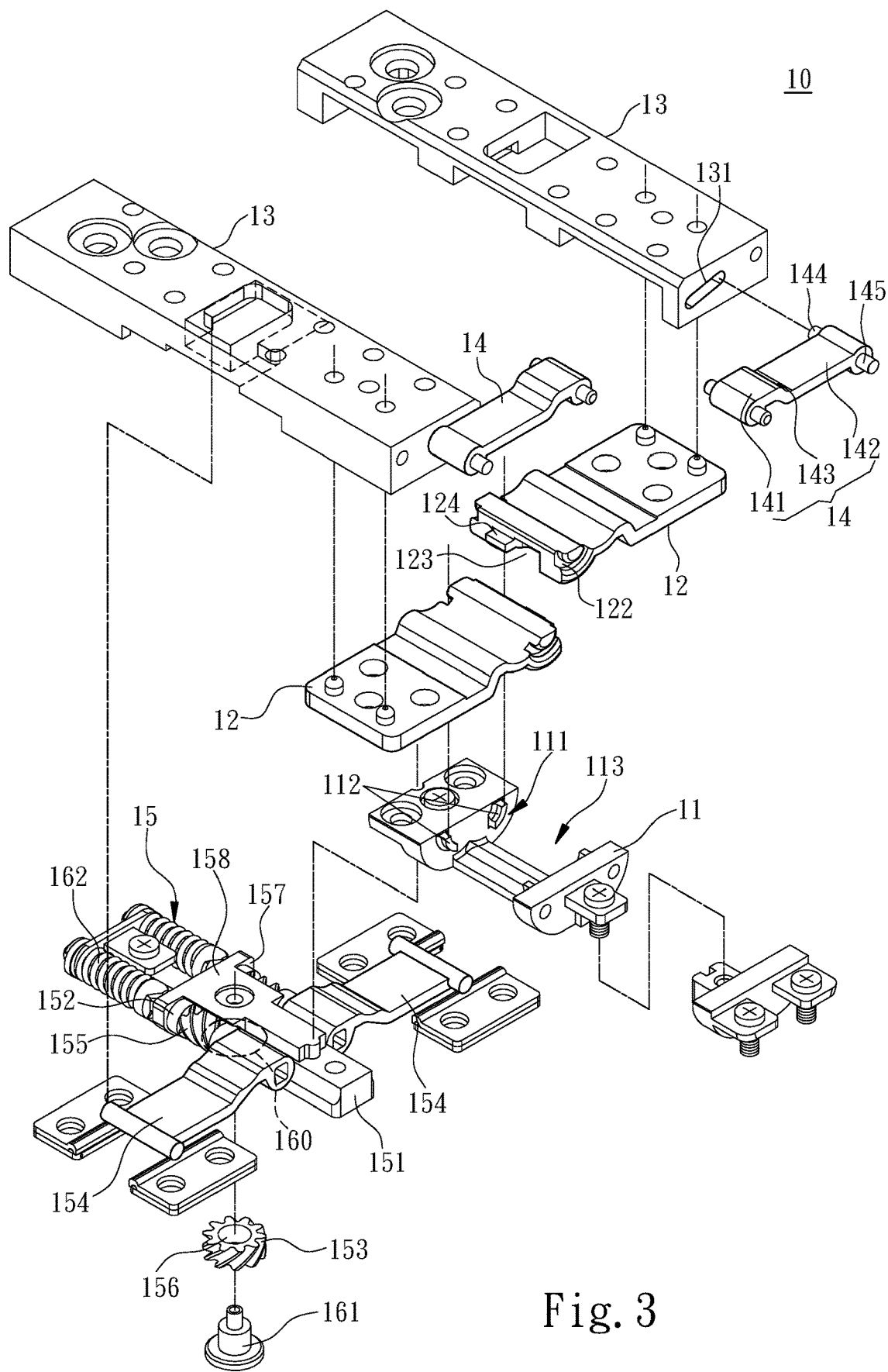
FIG. 3 is a second exploded view of the embodiment of the invention.
Figure 4:
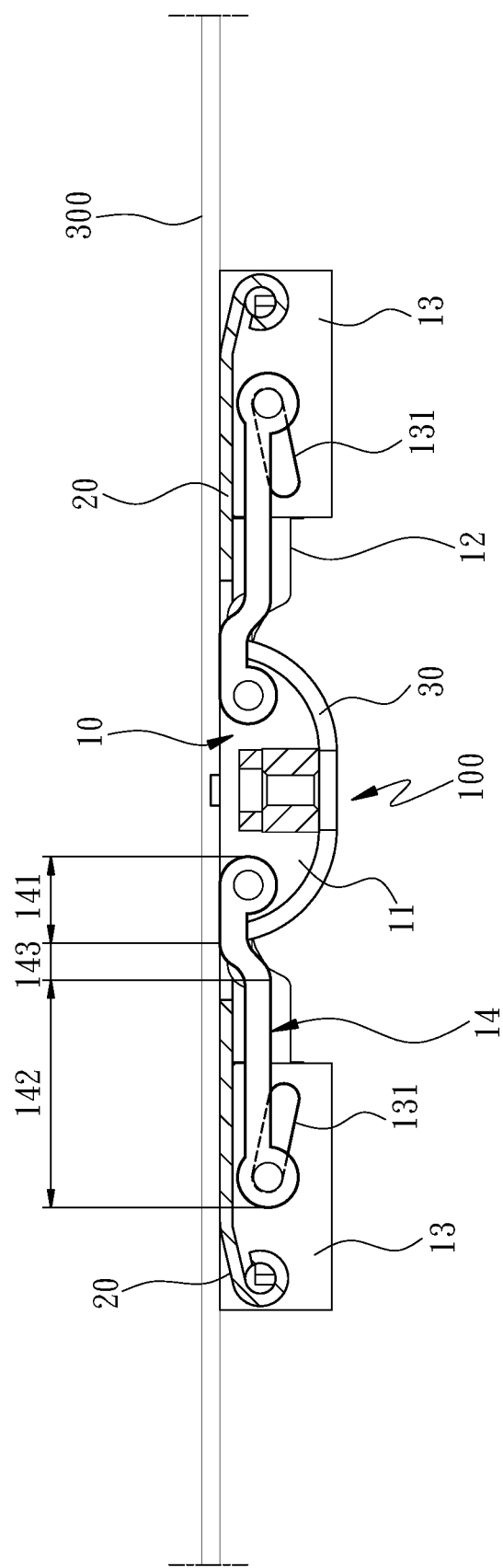
FIG. 4 is a cross-section view of the embodiment of the invention.
Figure 5:
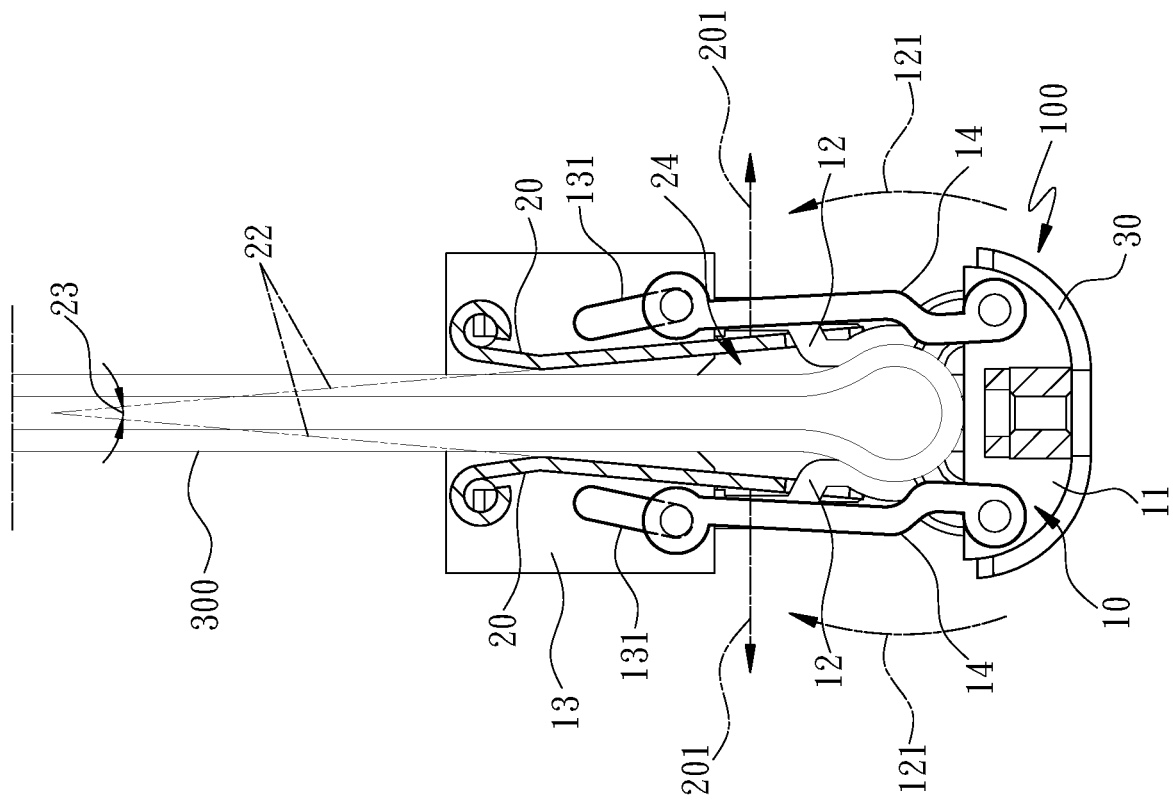
FIG. 5 is an operation diagram of the embodiment of the invention.

Referring to FIG. 1, FIG. 2, FIG. 3, FIG. 4, and FIG. 5, the invention provides a pivoting device 100 including a hinge assembly 10 and at least two support plates 20 disposed side by side to the hinge assembly 10. The hinge assembly 10 includes a base 11, two movable members 12 provided on the base 11, at least two fixed members 13 connecting the two movable members 12, and two driven levers 14 provided on the base 11. The base 11 is formed with at least two rails 111. The two movable members 12 are provided on the at least two rails 111. The at least two rails 111 restrict the two movable members 12 to displace in an arc-shaped path 121. The two movable members 12 move along the at least two rails 111 after being pushed open and close relative to each other during the displacement along the arc-shaped path 121, and the two movable members 12 drive the at least two fixed members 13 at the same time. The at least two fixed members 13 and the two movable members 12 are assembled to provide a flexible display 300 to be fixed thereto, so that the flexible display 300 is folded with the movement of the at least two fixed members 13. Furthermore, the two driven levers 14 are connected to the at least two fixed members 13 and are driven by the at least two fixed members 13. Each of the at least two fixed members 13 includes an oblique slot 131 provided for one of the two driven levers 14 to move therein. When the at least two fixed members 13 are driven by the two movable members 12, the oblique slot 131 drives the two driven levers 14 to move therein. The at least two support plates 20 are assembled with the hinge assembly 10 and move synchronously with the flexible display 300. The at least two support plates 20 are respectively formed with a sliding rail portion 21 at an end of each of the at least two support plates 20. The sliding rail portion 21 is provided for one of the two driven levers 14 to be arranged therein, so that the two driven levers 14 form an engagement with the at least two support plates 20 and slide in the sliding rail portion 21 when being driven.

Referring to FIG. 1, FIG. 2, FIG. 3, FIG. 4, and FIG. 5, operation of the pivoting device 100 will be described. In an initial case where the flexible display 300 is not folded, the two movable members 12 do not drive the at least two fixed members 13, and the two driven levers 14 do not slide along the two sliding rail portions 21, hence the at least two support plates 20 are laid flat to support the flexible display 300. When folding the flexible display 300, the two movable members 12 move in the arc-shaped path 121 and drive the at least two fixed members 13 to move. When the at least two fixed members 13 are moving and the two driven levers 14 are driven thereby, the two driven levers 14 slide along the two sliding rail portions 21 and the two oblique slots 131 simultaneously. When the at least two support plates 20 are driven and flipped by the at least two fixed members 13, the at least two support plates 20 change from a flat state to an upright state and tilt outward, and the path of movement of the at least two support plates 20 is indicated by 201 as shown. When the flexible display 300 is folded, two planar extension lines 22 of the at least two support plates 20 include an acute angle 23, a side of the flexible display 300 facing the base 11 is bent to form a water drop shape, and the side of the flexible display 300 is received in a wedge-shaped space 24 defined by the at least two support plates 20, thereby making the pivoting device 100 to comply with the length of the flexible display 300. When unfolding the flexible display 300, the two movable members 12 move in a contrary direction of the arc-shaped path 121 and drive the at least two fixed members 13 to be reset, and the two driven levers 14 are driven by the at least two fixed members 13 to slide along the two sliding rail portions 21 and the two oblique slots 131 in an opposite direction, so that the at least two support plates 20 in the upright state return to the flat state.

According to the invention, through the arrangement of the hinge assembly 10 and the at least two support plates 20, the at least two support plates 20 provide support for the flexible display 300 when the at least two support plates 20 are not driven, and the at least two support plates 20 are tilted outwards when the at least two support plates 20 are flipped, thereby facilitating the pivoting device 100 to comply with the length of the flexible display 300. Moreover, the invention has a simpler structure than the conventional technique and is conducive to implementing a lighter and thinner design.

Furthermore, with reference to FIG. 1, FIG. 2, FIG. 3, FIGS. 4, and FIG. 5, each of the two driven levers 14 includes a first engaging section 141 forming a junction with the base 11, a second engaging section 142 forming a junction with one of the at least two fixed members 13, and a bent section 143 connecting the first engaging section 141 and the second engaging section 142. In order to accommodate the flexible display 300, the first engaging section 141 and the second engaging section 142 are arranged in an unaligned position, which are in different extension lines, and a distance between two second engaging sections 142 is longer than a distance between two first engaging sections 141. Thus, when the two driven levers 14 are upright on the base 11, distance between the two second engaging sections 142 is long enough for a curved portion of the flexible display 300 to fit therebetween.

Furthermore, in order to assemble the two driven levers 14 with the at least two fixed members 13 and the at least two support plates 20, each of the two driven levers 14 is respectively formed with a first engaging arm 144 and a second engaging arm 145 at an end of the two driven levers 14 not engaged with the base 11. The first engaging arm 144 inserts into the oblique slot 131 and moves along the oblique slot 131. The second engaging arm 145 is provided on each of the two driven levers 14 opposite to the first engaging arm 144. The second engaging arm 145 extends into the sliding rail portion 21 and moves along the sliding rail portion 21. In an embodiment, the sliding rail portion 21 is an opening formed on one of the at least support plates 20, and the size of the second engaging arm 145 is determined by the opening. Each of the at least two support plates 20 includes a first portion 25 and a second portion 26. The first portion 25 overlaps one of the two movable members 12. The second portion 26 assembled on a side of one of the two driven levers 14 opposite to the at least two fixed members 13. The first portion 25 is positioned above one of the two driven levers 14. The second portion 26 is connected to the first portion 25 and is perpendicular to the first portion 25. The second portion 26 drives the first portion 25 when acted upon by one of the two driven levers 14, so that the first portion 25 is laid flat on the base 11 when the two driven levers 14 is not moved along the sliding rail portion 21, and the first portion 25 is upright on the base 11 after the two driven levers 14 are moved along the sliding rail portion 21.

According to the invention, each of the at least two rails 111 is provided with an arc-shaped rib 112 on two inner walls thereof. Each of the two movable members 12 is provided with an arc-shaped groove 122 on two side walls thereof accommodating the arc-shaped rib 112. The arc-shaped groove 122 limits the movement of the arc-shaped rib 112 so that the two movable members 12 only moves along the arc-shaped path 121. In another embodiment, each of the at least two rails 111 includes an open end 113, the two open ends 113 of the at least two rails 111 are positioned on both sides of the base 11, and the two open ends 113 accommodating the two movable members 12, respectively; when the two movable members 12 are laid flat on the base 11, the two open ends 113 allow the two movable members 12 to be accommodated in the at least two rails 111, so as to improve the thinning effect of the hinge assembly 10. In another embodiment, one of the two movable members 12 is formed with a positioning notch 123 facing the other one of the two movable members 12, and the other of the two movable members 12 is formed with a positioning projection 124 inserting into the positioning notch 123. The positioning projection 124 is fitted with the positioning notch 123, and the positioning projection 124 inserts into the positioning notch 123, thereby limiting the position of the two movable members 12 when the two movable members 12 are not displaced along the arc-shaped path 121.

In an embodiment, the hinge assembly 10 includes a torque-providing portion 15 connected to the base 11, and the torque-providing portion 15 provides a torque force required for the two movable members 12 to rotate. Specifically, the torque-providing portion 15 generates a torque force when the two movable members 12 are forced, thereby making the movement of the two movable members 12 smoother. The torque-providing portion 15 includes a support 151, two rotating shafts 152 provided in parallel on the support 151, and an idler gear 153 provided between the two rotating shafts 152. Herein, the support 151 is connected to the base 11, each of the two rotating shafts 152 includes a connecting member 154 engaged with one of the two movable members 12 and a gear 155 engaged with the idler gear 153. The two connecting members 154 are driven by the two rotating shafts 152 and make the torque-providing portion 15 and the two movable members 12 move synchronously. The two gears 155 and the idler gear 153 are cross-axis helical gears, and the torque required for the rotation of the two movable members 12 is provided through the engagement between the two gears 155 and the idler gear 153.

Furthermore, in an embodiment, the idler gear 153 includes a positioning hole 156, the support 151 includes a first plate 157 and a second plate 158 perpendicular to the first plate 157. The second plate 158 is provided for the idler gear 153 to be placed thereon, and the second plate 158 includes an idler gear retaining hole 160 in communication with the positioning hole 156 when the idler gear 153 is disposed on the second plate 158. The idler gear retaining hole 160 is provided for an engaging member 161 to be disposed therein to retain an engagement position of the idler gear 153.

In another embodiment, the torque-providing portion 15 includes two torque springs 162 provided at an end of each of the two rotating shafts 152, and the two torque springs 162 assist in providing the torque force required for the two movable members 12 to rotate.

In another embodiment, the pivoting device 100 includes a cover on a side of the hinge assembly 10 not facing the flexible display 300, and the cover 30 covers the hinge assembly 10 and protects the hinge assembly 10.

What is claimed is:

1. A pivoting device, comprising:
a hinge assembly, comprising a base, two movable members provided on the base, at least two fixed members connecting the two movable members and provided for a flexible display to be fixed thereon, and two driven levers provided on the base and driven by the two fixed members, wherein the base is formed with at least two rails respectively restricting the two movable members to displace in an arc-shaped path, the two movable members drive the two fixed members and fold the flexible display during the displacement in the arc-shaped path, and each of the two fixed members comprises an oblique slot provided for one of the two driven levers to move therein; and
at least two support plates, disposed side by side to the hinge assembly and moving synchronously with the flexible display, wherein the at least two support plates are respectively formed with a sliding rail portion at an end of each of the at least two support plates, the sliding rail portion is provided for one of the two driven levers to slide therein, and when the two driven levers do not slide along the sliding rail portion, the at least two support plates are laid flat so as to provide support for the flexible display; when the two driven levers are driven to slide along the sliding rail portion and the oblique slot simultaneously, the at least two support plates are flipped relative to each other and tilt outwards.

2. The pivoting device according to claim 1, wherein each of the two driven levers comprises a first engaging section forming a junction with the base, a second engaging section forming a junction with one of the two fixed members, and a bent section connecting the first engaging section and the second engaging section.

3. The pivoting device according to claim 2, wherein each of the two driven levers is formed with a first engaging arm and a second engaging arm at an end not engaged with the base, the first engaging arm is inserted into the oblique slot, and the second engaging arm is on a side opposite to the first engaging arm and inserted into the sliding rail portion.

4. The pivoting device according to claim 3, wherein the at least two support plates comprise a first portion overlapping one of the two movable members and one of the two driven levers, and a second portion perpendicular to the first portion and assembled on a side of the two driven levers opposite to the two fixed members.

5. The pivoting device according to claim 4, wherein the hinge assembly comprises a torque-providing portion connected to the base and providing a torque force for the two movable members to rotate.

6. The pivoting device according to claim 5, wherein the torque-providing portion comprises a support, two rotating shafts provided in parallel on the support, and an idler gear provided between the two rotating shafts, and wherein each of the two rotating shafts comprises a connecting member and a gear, the connecting member is engaged with one of the two movable members to move the torque-providing portion and the two movable members synchronously, the gear is engaged with the idler gear, and the gears of the two rotating shafts and the idler gear are cross-axis helical gears.

7. The pivoting device according to claim 6, wherein the idler gear comprises a positioning hole, and the support comprises a first plate and a second plate perpendicular to the first plate and provided for the idler gear to be placed thereon, the second plate comprises an idler gear retaining hole in communication with the positioning hole, an engaging member is disposed in the idler gear retaining hole when the idler gear is disposed on the second plate.

8. The pivoting device according to claim 7, wherein the torque-providing portion comprises a plurality of torque springs provided at an end of each of the two rotating shafts, respectively.

9. The pivoting device according to claim 1, wherein each of the two rails is provided with an arc-shaped rib on two inner walls thereof, and each of the two movable members is provided with an arc-shaped groove on two side walls thereof accommodating the arc-shaped rib.

10. The pivoting device according to claim 9, wherein the two rails comprises two open ends, and the two open ends of the two rails are positioned on two opposite faces of the base.

11. The pivoting device according to claim 10, wherein one of the two movable members comprises a positioning notch facing an another of the two movable members, and the another of the two movable members comprises a positioning projection inserted into the positioning notch.

* * * * *